United States Patent
Marsh et al.

(10) Patent No.: US 10,992,602 B2
(45) Date of Patent: Apr. 27, 2021

(54) SEQUENTIAL STORAGE OF COLLECTED DATA FROM HETEROGENEOUS INTERVALS

(71) Applicant: Landis+Gyr Innovations, Inc., Alpharetta, GA (US)

(72) Inventors: Ivan Marsh, Woodstock, GA (US); Michael Bellville, Suwanee, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 16/543,950

(22) Filed: Aug. 19, 2019

(65) Prior Publication Data

US 2021/0058344 A1 Feb. 25, 2021

(51) Int. Cl.
*H04L 12/879* (2013.01)
*H04L 12/26* (2006.01)
*H04L 29/06* (2006.01)
*G06Q 50/06* (2012.01)

(52) U.S. Cl.
CPC .......... *H04L 49/901* (2013.01); *G06Q 50/06* (2013.01); *H04L 43/0805* (2013.01); *H04L 63/10* (2013.01); *Y04S 20/30* (2013.01)

(58) Field of Classification Search
CPC .......... H04L 63/10; G06Q 50/06; Y04S 20/30
See application file for complete search history.

(56) References Cited

U.S. PATENT DOCUMENTS

| | | | | |
|---|---|---|---|---|
| 6,133,943 | A | * | 10/2000 | Needham .............. G06T 3/4038 348/37 |
| 6,856,257 | B1 | * | 2/2005 | Van Heteren ............ H04Q 9/00 340/10.1 |

(Continued)

FOREIGN PATENT DOCUMENTS

| | | |
|---|---|---|
| CN | 108111552 | 6/2018 |
| JP | 01180651 | 7/1989 |

OTHER PUBLICATIONS

International Patent Application No. PCT/US2020/045933, International Search Report and Written Opinion, dated Oct. 5, 2020, 18 pages.

*Primary Examiner* — Lashonda T Jacobs
(74) *Attorney, Agent, or Firm* — Kilpatrick Townsend & Stockton LLP (57) ABSTRACT

A method performed by a node includes writing normal records to a buffer. Each normal record is associated with a respective time interval having a respective start time and end time according to network time, and each normal record includes respective collected data describing an activity. The method includes detecting that access to network time has become unavailable as well as detecting that access to network time has become available after having been unavailable. The method includes determining information describing an incomplete period during which network time was unavailable, where the incomplete period includes at least one of a skipped interval and a standby interval. During each skipped interval, no collected data describing the activity is collected. Each standby interval is associated with respective collected data describing the activity during the incomplete period. The method includes writing to the buffer a placeholder record including the information describing the incomplete period.

20 Claims, 7 Drawing Sheets

(56) References Cited

U.S. PATENT DOCUMENTS

| | | | | |
|---|---|---|---|---|
| 8,305,232 B2* | 11/2012 | Gilbert | G01R 22/066 | 340/870.02 |
| 8,423,637 B2* | 4/2013 | Vaswani | H04L 43/16 | 709/224 |
| 8,972,607 B2* | 3/2015 | Callaghan | H04L 67/1095 | 709/248 |
| 9,106,365 B1* | 8/2015 | Bonicatto | G04G 7/00 | |
| 9,204,405 B2* | 12/2015 | Hildebrandt | H04Q 9/04 | |
| 9,317,572 B2* | 4/2016 | Hsieh | H04L 67/1042 | |
| 9,612,132 B2* | 4/2017 | Borleske | G01D 4/002 | |
| 9,629,109 B2* | 4/2017 | Hartman | H04W 56/001 | |
| 9,674,589 B2* | 6/2017 | Osterloh | H04Q 9/00 | |
| 9,742,644 B2* | 8/2017 | Osterloh | H04L 43/06 | |
| 10,382,594 B2* | 8/2019 | Gupta | H04L 69/18 | |
| 10,607,712 B1* | 3/2020 | Buxton | G06F 11/1048 | |
| 2007/0001868 A1* | 1/2007 | Boaz | G01D 4/004 | 340/870.02 |
| 2007/0013547 A1* | 1/2007 | Boaz | G01D 4/002 | 340/870.02 |
| 2008/0037903 A1* | 2/2008 | Sekiguchi | G06F 17/17 | 382/305 |
| 2010/0124240 A1* | 5/2010 | Lu | H04W 56/00 | 370/503 |
| 2010/0176967 A1* | 7/2010 | Cumeralto | H04Q 9/00 | 340/870.02 |
| 2010/0188255 A1* | 7/2010 | Cornwall | G01D 4/004 | 340/870.02 |
| 2010/0188259 A1* | 7/2010 | Johnson | G01D 4/002 | 340/870.02 |
| 2010/0188623 A1* | 7/2010 | Nakagawa | G02F 1/133753 | 349/96 |
| 2010/0188938 A1* | 7/2010 | Johnson | G01D 4/004 | 368/47 |
| 2011/0074598 A1* | 3/2011 | Cornwall | G01D 4/002 | 340/870.02 |
| 2012/0201146 A1* | 8/2012 | Shuey | H04W 40/14 | 370/252 |
| 2012/0254418 A1 | 10/2012 | Callaghan et al. | | |
| 2012/0269204 A1 | 10/2012 | Zampetti | | |
| 2013/0275736 A1* | 10/2013 | Kelley | G06Q 50/06 | 713/1 |
| 2013/0300577 A1* | 11/2013 | Cumeralto | H04Q 9/00 | 340/870.02 |
| 2014/0309956 A1 | 10/2014 | Mondot | | |
| 2014/0379154 A1* | 12/2014 | Watanabe | G05F 1/66 | 700/291 |
| 2015/0088442 A1* | 3/2015 | Farrar | G01R 21/1333 | 702/62 |
| 2015/0206256 A1* | 7/2015 | Fan | G06Q 50/06 | 705/412 |
| 2015/0350458 A1* | 12/2015 | Lang | H04M 15/59 | 455/408 |
| 2016/0363956 A1 | 12/2016 | Moore et al. | | |
| 2017/0019697 A1* | 1/2017 | Hundemer | H04N 21/458 | |
| 2018/0124219 A1* | 5/2018 | Klopfenstein | H04L 69/22 | |
| 2019/0095297 A1* | 3/2019 | Neall | G06F 11/1471 | |

\* cited by examiner

SEQUENTIAL STORAGE OF COLLECTED DATA FROM HETEROGENEOUS INTERVALS

TECHNICAL FIELD

Various embodiments of the invention relate to data storage and, more particularly, to sequential storage of collected data from heterogeneous intervals.

BACKGROUND

A utility meter measures consumption of a resource. The resulting consumption data, which describes consumption of the resource, is stored on the utility meter at least temporarily. From time to time, the utility meter transmits data packets including the consumption data, either directly or indirectly, to a headend system of a service provider. The service provider uses the consumption data, for example, to bill a customer based on actual consumption of the resource.

Typically, consumption data is collected in fixed-length time intervals (e.g., fifteen-minute intervals), such that consumption data collected by the utility meter during a specific time interval (e.g., 9:00 am to 9:15 am on a given date) is stored on the utility meter in a record associated with that specific time interval. Thus, the utility meter maintains a set of records, each representing a time interval of an established length and each ideally associated with a respective start time. There typically exists a pre-established protocol for the transmission of consumption data, such that a data packet that includes the consumption data adheres to a specific format. For instance, a data packet includes consumption data for a set of time intervals, where each such time interval is associated with collected data. The data packet indicates the start time of the set of time intervals, and thus, given that the time intervals are consecutive, the start time for each time interval in the data packet can be inferred based on the start time of the entire set of time intervals.

A utility meter may not always maintain precise time internally, and this is particularly the case for battery-powered utility meters. For instance, although a utility meter may maintain an internal time, that internal time may drift from network time when the utility meter goes to sleep for the purpose of saving battery power or for another purpose. For another example, if the utility meter temporarily loses its network connection, the internal time of the utility meter may drift away from the network time. However, the utility meter is typically part of a network, and thus, the utility meter can utilize network time, maintained by the network, to ensure that each record of consumption data represents a time interval that is properly aligned with the start of an established time interval (i.e., time-aligned). From time to time, however, a utility meter may lose its network connection and may therefore lose network time. Although the utility meter can still collect consumption data and can still count out the length of a time interval via an internal counter, the utility meter is unable to associate the consumption data with an accurate start time. In part, this is because, if the utility meter lost power, the utility meter does not know how many time intervals have passed while the utility meter did not have power, which would lead to lost time and inability to assume that internal time-keeping is aligned with the network time.

To handle this case, two buffers are typically used. Records associated with respective start times, referred to herein as normal records, are written to a main buffer, and records representing standby intervals, referred to herein as standby records, are written to a temporary buffer. Because specific start times are not known for standby intervals, records of consumption data associated with standby intervals are typically not written directly into the main buffer. However, after network time becomes available, a start time can be established for each standby interval. Upon receiving network time, the main buffer of the utility meter is padded with zeroes, forming empty records, to represent skipped time intervals during which consumption data was not collected. At a position representing the established start time of standby records, each standby record is copied from the temporary buffer into the main buffer. The result is that the main buffer eventually includes normal records, standby records, and empty records, and each such record is eventually associated with a respective start time.

SUMMARY

In one embodiment, a method performed by a node includes writing to a buffer one or more normal records. Each normal record is associated with a respective time interval having a respective start time and a respective end time according to network time, and each normal record includes respective collected data describing an activity during the respective time interval. The network time provided through a network to which the node is joined. The method further includes detecting that access to the network time has become unavailable as well as detecting that access to the network time has become available after having been unavailable. The method further includes determining information describing an incomplete period during which the network time was unavailable, where the incomplete period includes at least one of a skipped interval and a standby interval. During each skipped interval, no collected data describing the activity is collected. Each standby interval is associated with respective collected data describing the activity during the incomplete period. Further, the method includes writing to the buffer a placeholder record including the information describing the incomplete period.

In another embodiment, a utility meter includes a memory having computer-readable instructions as well as one or more processors for executing the computer-readable instructions. The computer-readable instructions include writing to a buffer one or more normal records. Each normal record is associated with a respective time interval having a respective start time and a respective end time according to network time, and each normal record includes respective collected data describing an activity during the respective time interval. The network time provided through a network to which the node is joined. The computer-readable instructions further include detecting that access to the network time has become unavailable as well as detecting that access to the network time has become available after having been unavailable. The computer-readable instructions further include determining information describing an incomplete period during which the network time was unavailable, where the incomplete period includes at least one of a skipped interval and a standby interval. During each skipped interval, no collected data describing the activity is collected. Each standby interval is associated with respective collected data describing the activity during the incomplete period. Further, the computer-readable instructions include writing to the buffer a placeholder record including the information describing the incomplete period.

In yet another embodiment, a computer-program product for writing heterogeneous records to a buffer includes a computer-readable storage medium having program instructions embodied thereon. The program instructions are executable by a processor of a node to cause the processor to perform a method including writing to a buffer one or more normal records. Each normal record is associated with a respective time interval having a respective start time and a respective end time according to network time, and each normal record includes respective collected data describing an activity during the respective time interval. The network time provided through a network to which the node is joined. The method further includes detecting that access to the network time has become unavailable as well as detecting that access to the network time has become available after having been unavailable. The method further includes determining information describing an incomplete period during which the network time was unavailable, where the incomplete period includes at least one of a skipped interval and a standby interval. During each skipped interval, no collected data describing the activity is collected. Each standby interval is associated with respective collected data describing the activity during the incomplete period. Further, the method performed by the processor includes writing to the buffer a placeholder record including the information describing the incomplete period.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Several drawbacks exist with the current method of recording consumption data, or the lack thereof, for intervals during which network time is unavailable. First, the maintenance of two distinct buffers can lead to an inefficient use of space given the relatively small amount of storage available on most utility meters. The use of empty records to separate standby records from prior records to align the standby records with an appropriate start time wastes internal storage space because the padding in empty records does not provide substantive information. If the task of copying data from the temporary buffer to the main buffer, thereby modifying the main buffer, is interrupted, such as due to a loss of power or a reset, then the data in the main buffer can become corrupted. Further, because the main buffer is modified, a true record of what occurred at the meter is lost and cannot be used for diagnostic purposes.

Various implementations of the invention described herein overcome these drawbacks. Network time may become unavailable to a node, for example, if the node goes to sleep or becomes disconnected from a network, such that the node can no longer detect synchronization packets sent through the network. In some implementations, while network time is unavailable, standby records are written to a buffer in the same manner as records associated with start times are written, despite the fact that network time is not known for standby records. Upon receiving network time again, the utility meter may write a placeholder record into the buffer after the standby records. Based on an analysis of records previously written and further based on the current network time, the utility meter may determine whether any intervals were skipped (e.g., due to the utility meter having lost power). The placeholder record includes data necessary to generate a data packet in the format expected by a headend system. For instance, the placeholder record indicates a start time of the period for which network time was unavailable, and the placeholder record indicates the number of standby intervals or the number of skipped intervals, or both, that occurred during that period. When transmitting a data packet later, the utility meter reads the records in the buffer until reaching a standby record. In some implementations, the utility meter then scans ahead to the placeholder record, which describes the period during which network time was unavailable. Based on the placeholder record, the utility meter transmits a series of empty records, each of which represents a corresponding skipped interval, along with standby records that are properly time-aligned.

As described above, some implementations described herein utilize a single buffer to store both normal records, for which start times are known, and standby records, for which start times are not known at the time of recording. Storage space is saved through the use of a single buffer as well as through avoiding the use of padding in that buffer. Further, the task of copying data from a temporary buffer is avoided, which maintains an original record of what occurred, and which avoids the risk of corruption in the case that the copying of data is interrupted. Thus, implementations described herein have numerous technical advantages over existing methodologies.

Figure 1:
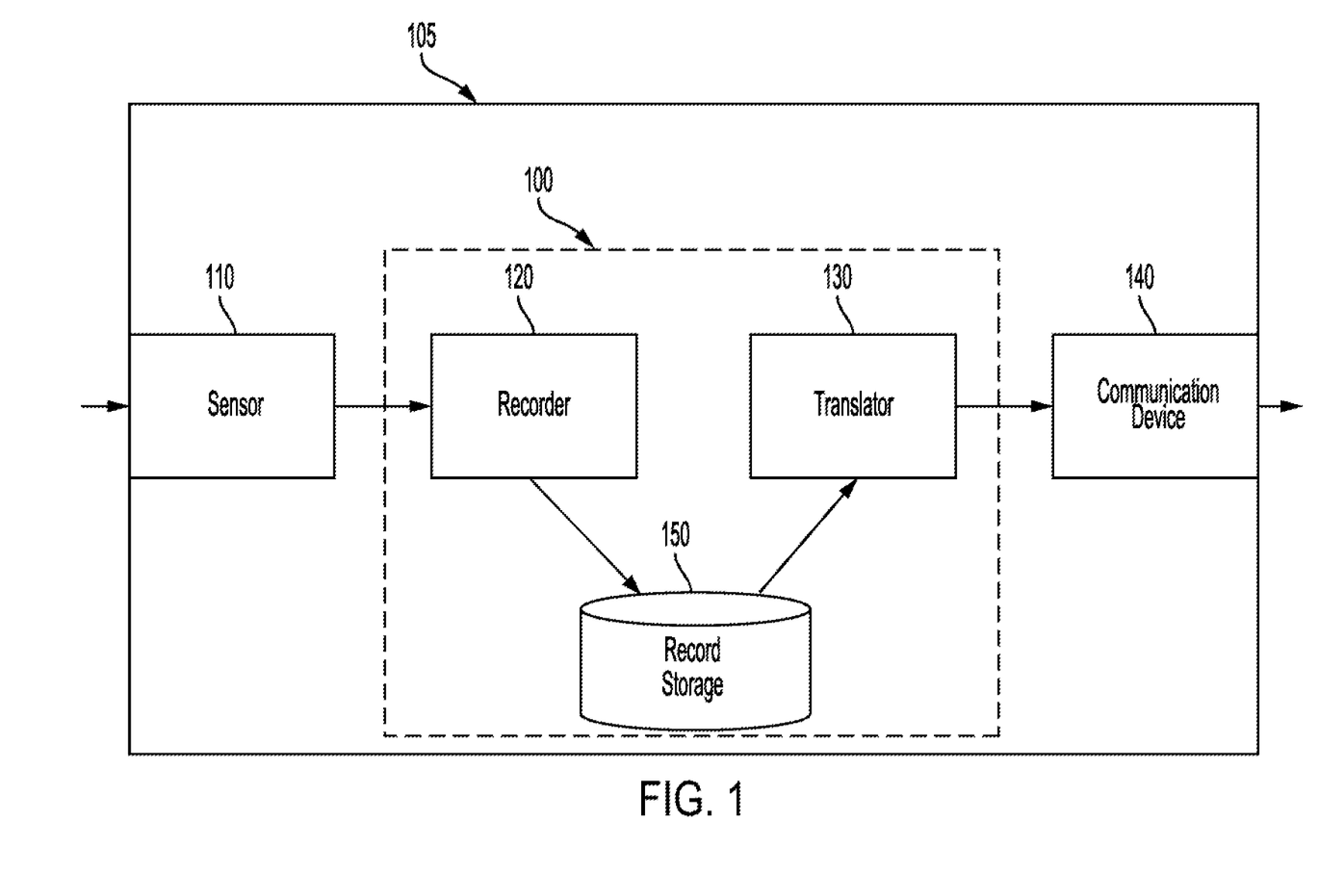
FIG. 1 is a conceptual diagram of a recording system for recording data collected during various time intervals, according to some implementations of the invention.

FIG. 1 is a conceptual diagram of a recording system 100 for recording data collected during various time intervals, according to some implementations of the invention. As shown in FIG. 1, the recording system 100 is integrated into a node 105 and may include a sensor 110, a recorder 120, a translator 130, and a communication device 140. In some implementations, the sensor 110 collects data, such as consumption data, associated with one or more time intervals; the recorder 120 writes the collected data, along with one or more placeholder records, to a record storage 150; the translator translates each placeholder record while transmitting, or preparing to transmit, a data packet; and the communication device transmits the data packet.

Each of the sensor 110, the recorder 120, the translator 130, and the communication device 140 may be implemented as hardware, software, or a combination of both. For example, and not by way of limitation, the sensor 110 may be specialized hardware configured to detect a signal indicating consumption of a resource, the recorder 120 and the translator 130 may each be implemented as software functions, and the communication device 140 may be a radio or network card with firmware as needed. It will be understood that, although the sensor 110, the recorder 120, the translator 130, and the communication device 140 are shown and described as being distinct from one another, this distinction is for illustrative purposes only, and these components may be integrated together or further divided. For example, and not by way of limitation, the recorder 120 and the translator 130 may be integrated into a single component, such that the recorder 120 and the translator 130 are implemented as a single piece of code or are as a single specialized hardware device. For another example, the sensor 110 is integrated into the communication device 140, such that data is collected by the sensor 110 by being received by way of the communication device 140. It will be understood that various implementations are possible in accordance with this disclosure.

The record storage 150 may be a buffer, specifically, for instance, a sequential or linear buffer such that data is written to the record storage 150 in a linear fashion and, in some implementations, accessed from the record storage 150 in a linear fashion. For example, and not by way of limitation, the record storage 150 is in the form of one or more memory pages, such that each page is readable from a starting index on that page, and data located after the starting index is reached by scanning forward from the starting index. In other words, memory locations in the record storage 150 are accessed consecutively in some implementations.

Figure 2:
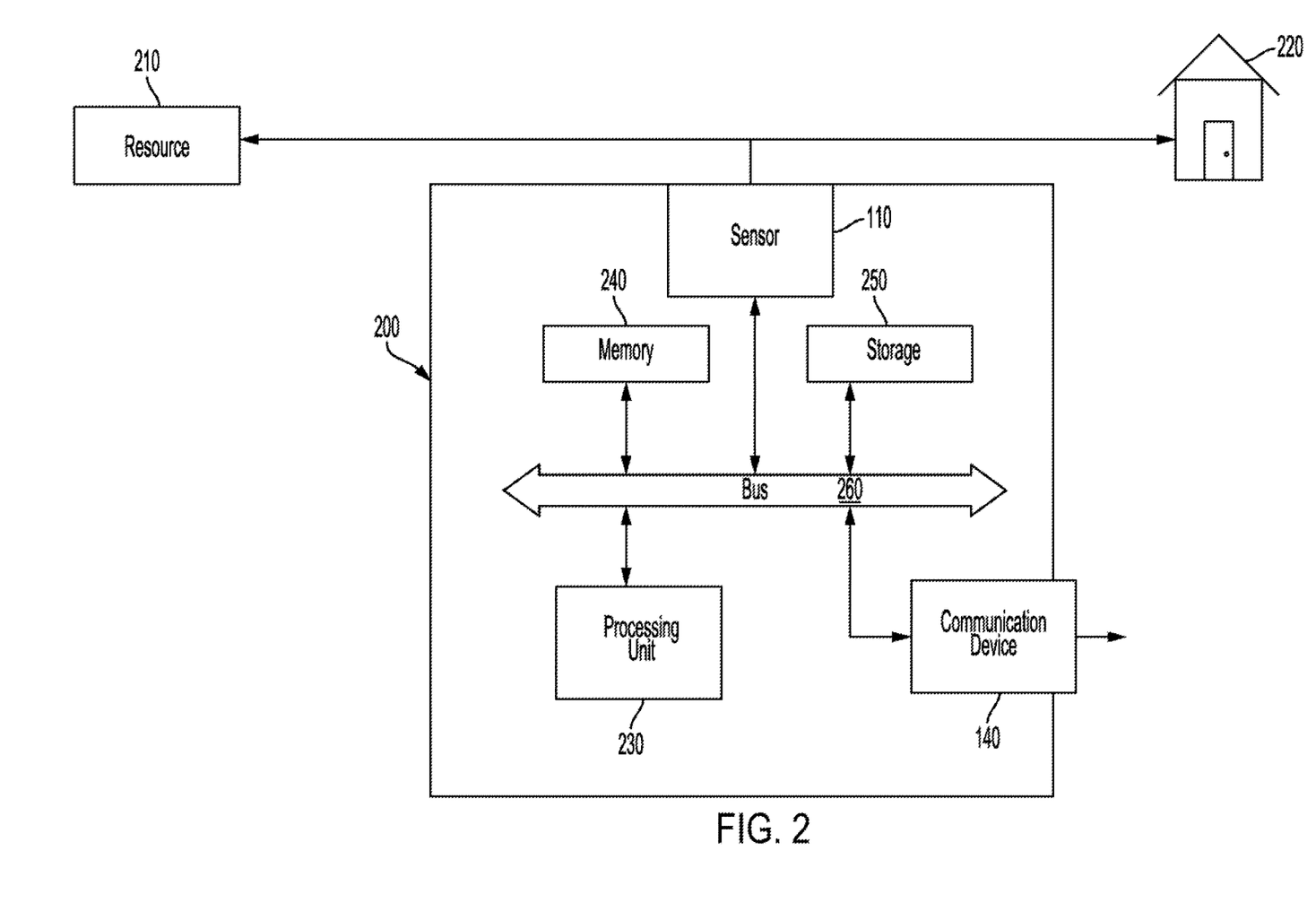
FIG. 2 is an architectural diagram of a utility meter with an integrated recording system, according to some implementations of the invention.

FIG. 2 is an architectural diagram of a node 105, specifically a utility meter 200, with an integrated recording system 100 according to some implementations of the invention. For example, and not by way of limitation, the utility meter 200 may be a water meter, a gas meter, or any other type of meter that measures consumption of a resource 210. Certain implementations of the invention described herein are well-suited for integration into low powered endpoints, such as battery-powered utility meters 200, such as a water meter or a gas meter, as such utility meters 200 may benefit from an improved mechanism for recording standby and skipped intervals.

As shown in FIG. 2, the utility meter 200 measures consumption of a resource 210 occurring on a premises 220. The utility meter 200 may include a processing unit 230, a memory 240, and a storage 250, which may be in communication with one another by way of a bus 260. For example, and not by way of limitation, the memory may be random-access memory (RAM), and the storage 250 may be flash storage or read-only memory (ROM). Although the processing unit 230, the memory 240, and the storage 250 are shown and described herein as being distinct components, it will be understood that this distinction is for illustrative purposes only. For instance, the processing unit 230, the memory 240, and the storage 250 may be integrated together into a single chip, such as a microcontroller unit.

As described in detail herein, in some implementations, the recorder 120 generates a placeholder record, and the translator 130 translates the placeholder record when generating a data packet for transmission. In some implementations, the operations of the recorder 120 and the translator 130 are embodied as program instructions stored in a computer-readable medium, such as the storage 250 or the memory 240. In some implementations, the computer-readable medium is a non-transitory computer-readable medium. Additionally or alternatively, the record storage 150 described herein may be implemented as at least a portion of the memory 240 or the storage 250. The processing unit 230 may execute the program instructions to implement the recorder 120 and the translator 130, with reference to the record storage 150, as described herein.

As described above with reference to FIG. 1, the recording system 100 may include a sensor 110 and a communication device 140. As shown in FIG. 2, the utility meter 200 may include such a sensor 110 and communication device 140 for use as described herein. In some implementations, the sensor 110 of the utility meter 200 is configured to detect consumption of the resource 210, thereby enabling the utility meter 200 to collect consumption data. The communication device 140 of the utility meter 200 may be, for example, a radio or a wireless fidelity (WiFi) card, which may be used to transmit a data packet including a set of records of consumption data or other collected data as described herein.

Although this disclosure refers repeatedly to implementations of the invention being embodied in utility meters 200, it will be understood by one skilled in the art that implementations described herein are not limited to utility meters 200. Rather, an implementation of the invention may be used for recording data on behalf of various types of nodes 105 that collect data for later transmission.

Figure 3:
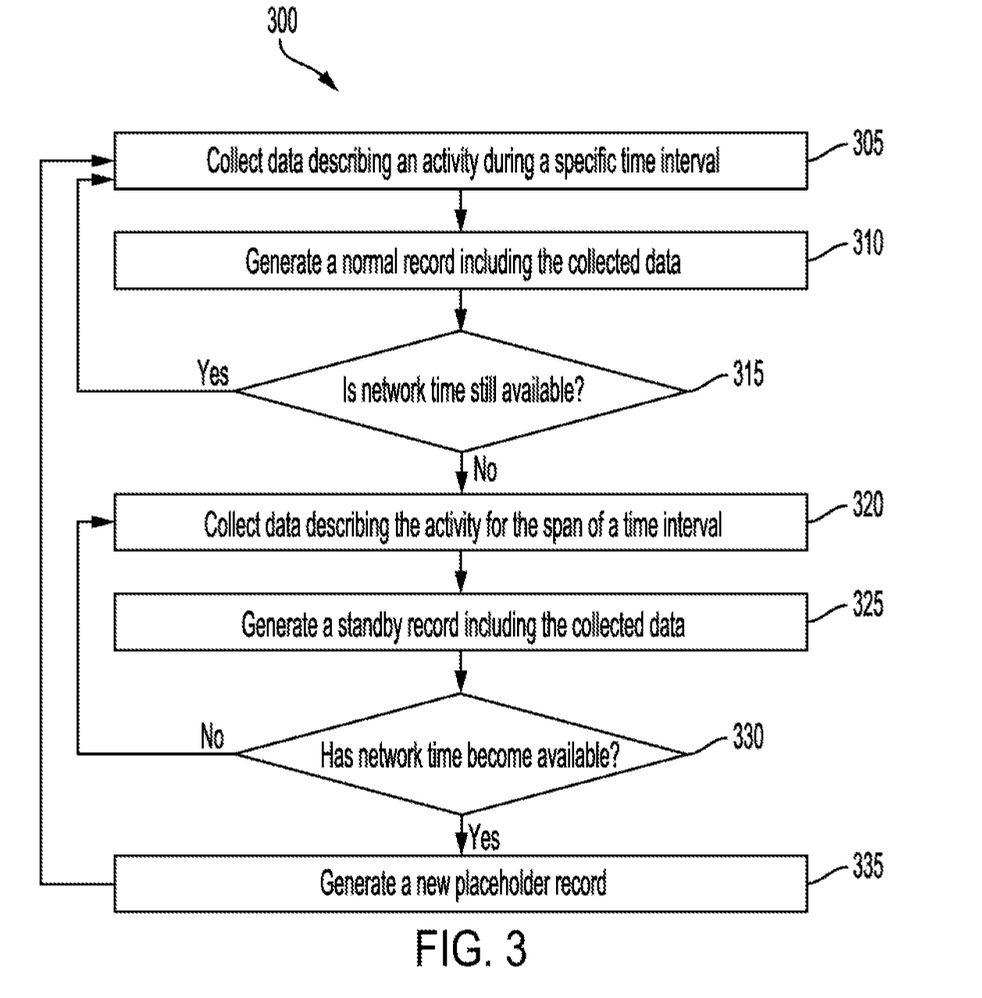
FIG. 3 is a flow diagram of a method of recording collected data occurring during time intervals, according to some implementations of the invention.

FIG. 3 is a flow diagram of a method 300 of recording collected data during time intervals, according to some implementations of the invention. Generally, the node 105 utilizes its sensor 110 to collect data, where each portion of collected data is associated with a time interval during which the collected data was collected. For instance, in the case of a utility meter 200, consumption data is collected and stored in records, where each record corresponds to consumption data describing consumption of a resource 210 during a specific time interval. It will be understood that this method 300 is illustrative and does not limit the various implementations of the invention.

As shown in FIG. 3, at block 305, the node 105 collects data, referred to herein as collected data, describing an activity occurring during a specific time interval. Specifically, for instance, the sensor 110 collects the data, such as by detecting a signal or by receiving the data from an external source. The collected data may be associated with a specific time interval, such as by being detected by the sensor 110 during the specific time interval or being detected by an external source during the specific time interval and then transmitted to the node 105 for collection. In this example, the specific time interval has a known start time that is interval-aligned, also referred to herein as time-aligned, with established intervals for data collection. For instance, if it has been established that data will be collected in fifteen-minute intervals aligned with each quarter hour, then specific intervals that are interval-aligned may include intervals that begin at 9:00 am, 9:15 am, 9:30 am, etc., on a given day.

The collected data may describe an activity occurring during the time interval. For example, and not by way of limitation, the collected data may be consumption data describing consumption of the resource 210, such as water or gas. In some implementations, the activity about which data is collected is consistent and thus need not be specifically identified in each record.

At block 310, the node 105 generates a normal record including the collected data. Specifically, for instance, the recorder 120 writes the normal record to the record storage 150, where the normal record includes the collected data associated with the specific time interval corresponding to the normal record. The normal record may include, at least, an indication of the collected data. The normal record may, but need not, include a start time of the specific time interval or a length of the specific time interval. In some implementations, the normal record need not include an indication of the start time or the length of the time interval, because this information may be implied. For instance, if the time intervals have a fixed length of fifteen minutes, then it can be inferred that each normal record has a start time fifteen minutes later than the start time of the immediately previous normal record. In some implementations, the start time associated with a normal record is stored in the respective normal record for only a select set of normal records. For instance, normal records that the node 105 plans to use as the first in a series of records in a data packet may each be associated with a respective start time that is stored in, or stored in association with, the respective normal record. As a result, such normal records can act as a basis for determining the start times of other records.

At decision block 315, the node 105 determines whether network time is still available. For example, the communication device 140 may report a loss of connection, which results in a loss of network time, and by the loss in connection, the node 105 may be aware that network time has been lost. For another example, network time may be unavailable when the node 105 powers on for the first time or has just rebooted, such as after a firmware update or after a tool connection. If network time is still available, then the method 300 returns to block 305. In some implementations, blocks 305 and 310 of the method 300 are repeated for as long as network time is available. Further, if network time is lost during a current time interval, then the current time interval may still be represented as a normal record because a start time for the current time interval is known. In contrast, as described below, a standby record represents a time interval for which a start time is not known upon the writing of the standby record. Thus, if it is determined that network time is unavailable, then the method 300 proceeds to block 320.

At block 320, the node 105 collects data describing an activity occurring for the span of a time interval. Specifically, for instance, the sensor 110 collects the data, such as by detecting a signal or by receiving the data from an external source. In some implementations, because network time is unavailable, the collected data is not associated with a specific time interval having a known start time. However, the node 105 may include an internal counter, which may ensure that each standby record is associated with collected data for a time span equal to the length of a time interval.

At block 325, the node 105 generates a standby record including the collected data spanning a time interval without a known start time. Specifically, for instance, the recorder 120 writes the standby record to the record storage 150. The standby record may include, at least, an indication of the collected data associated with the time interval having an unknown start time.

In some implementations, it cannot be assumed that a standby record written immediately following a normal record is associated with a start time an interval length after the start time of the normal record. For instance, if the internal counter of the node 105 stopped for some reason, then there is no guarantee that the internal counter is still aligned with actual network time. For further example, the internal counter might have stopped if the node 105 lost power or if a service tool was connected to the node 105.

Thus, in some implementations, although a standby record may immediately follow a normal record in the record storage 150, there is no guarantee that the time interval represented by the standby record immediately follows the time interval of the normal record. Thus, as described herein, some implementations do not assume that the start time of a standby record is known.

At decision block 330, it may be determined whether network time is once again available. If network time remains unavailable, then the method 300 may return to block 320 to continue collecting data for time intervals without known start times. However, if network time is available, then the method 300 proceeds to block 335.

Although this decision block 330 appears in FIG. 3 as occurring after blocks 320 and 325, the node 105 may detect the availability of network time at any point during a time interval. Upon receiving network time, the interval-aligned start time of a current time interval can be determined based on the current network time and the established alignment of time intervals. In some implementations, the most recent interval-aligned start time may be used as the start time of a current time interval. For example, if network time becomes available at 9:35 am, and properly aligned time intervals begin on each quarter hour, then the interval-aligned start time of the current time interval is 9:30 am, which is the most recent interval-aligned start time. Thus, upon receiving network time again, the current time interval now has a known start time, and the node 105 may continue to collect data during the current time interval, so as to eventually represent the current time period as a normal record. However, in some implementations, prior to writing that normal record for which the time interval is not yet complete, a placeholder record may be written to describe the period during which network time was unavailable. Herein, such a period is referred to as an incomplete period.

At block 335, the node 105 generates a placeholder record. More specifically, for instance, the recorder 120 analyzes the record storage 150 to determine information needed for the placeholder record, and the recorder writes the placeholder record to the record storage 150, as described in more detail below.

Figure 4:
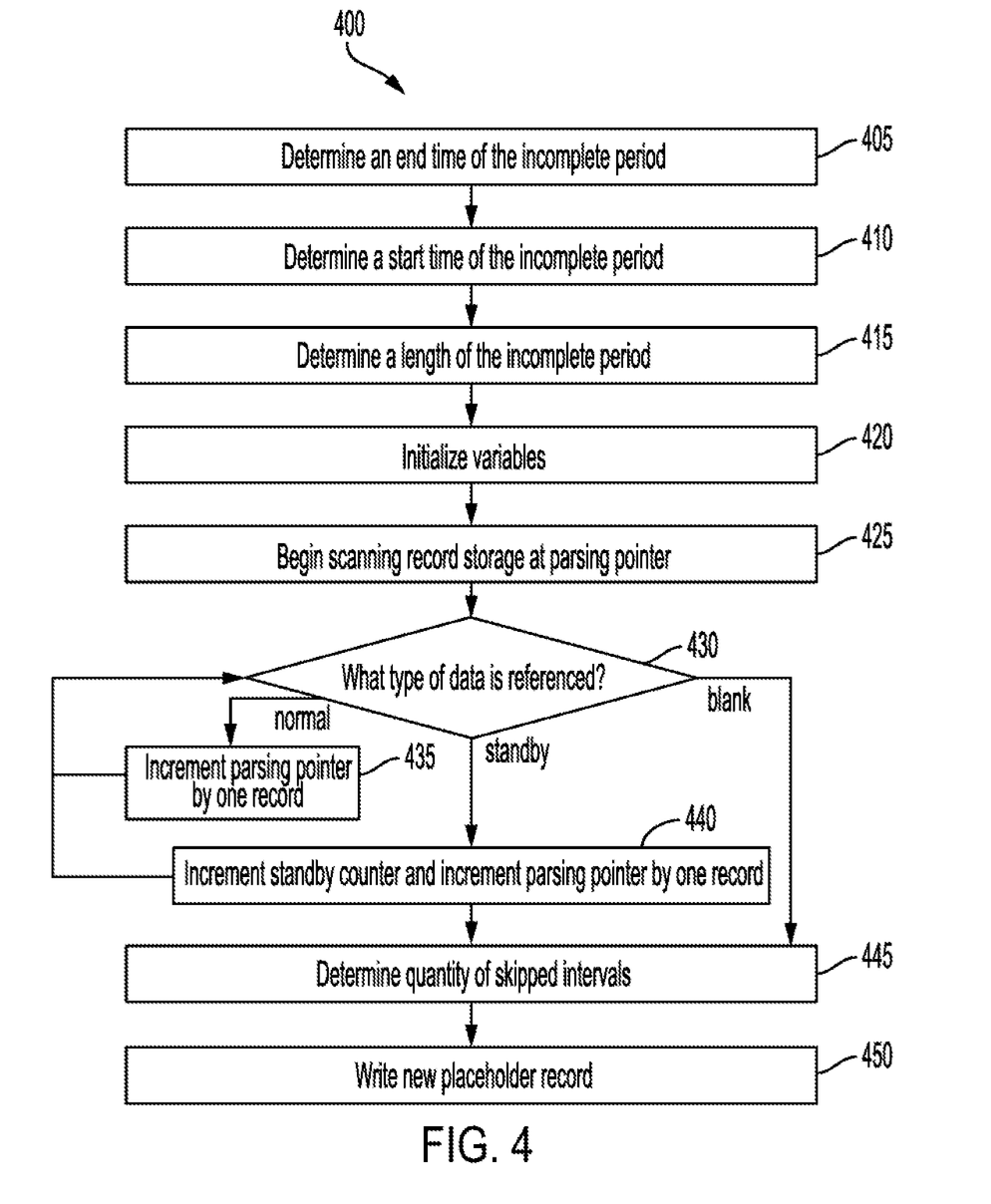
FIG. 4 is a flow diagram of a method of generating a placeholder record, according to some implementations of the invention.

FIG. 4 is a flow diagram of a method 400 of generating a new placeholder record, according to some implementations of the invention. More specifically, the method 400 of FIG. 4 may be performed at block 335 of the above method 300, and further, this method 300 may be performed by the recorder 120 of the node 105.

Generally, when generating a new placeholder record, the recorder 120 may determine information about the incomplete period. Specifically, the information determined includes the start time of the incomplete period, the quantity of standby records representing standby intervals (i.e., time intervals without known start times), and the quantity of skipped intervals (i.e., time intervals for which no data was collected). The new placeholder record may describe the incomplete period, thus enabling the translator 130 to generate a series of records, including a combination of standby records representing standby intervals and empty records representing skipped intervals, on the fly as a data packet is being transmitted. Thus, rather than storing padding to represent skipped intervals, as done conventionally, implementations described herein may save storage space by utilizing a placeholder record and may generate padding in the form of empty records during transmission as needed to comply with an established format for data packets.

As shown in FIG. 4, at block 405, the recorder 120 determines an end time of the incomplete period. This end time may be equivalent to the start time of the current time-aligned time interval that is running when network time once again becomes available. For instance, if network time becomes available during a time interval, then the time-aligned beginning of that time interval is determined. For instance, if time intervals are scheduled to start every fifteen minutes on the quarter hour, then the most recent quarter hour is taken as the beginning of the current time interval. As mentioned above, in some implementations, an incomplete period spans between the end of the last time interval with a known start time (i.e., the end time of the prior normal record) and the start time of the current time interval that is running when network time becomes available again. Thus, the start time for the current time interval may mark the end time of the incomplete period.

At block 410, the recorder 120 determines a start time of the incomplete period. In some implementations, the start time of the incomplete period may be the end time of the last normal record prior to the beginning of the incomplete period, which is equal to the start time of that last normal record plus the length of a time interval. In some implementations, a start time is not stored for all normal records because start times are implicit based on the fixed length of time intervals. However, various mechanisms may be used to determine the start time of the incomplete period. For example, and not by way of limitation, the recorder 120 may scan back in the record storage 150 to a normal record associated with a start time (e.g., a normal record intended to be the first in a data packet), or the recorder 120 may scan back to a placeholder record, each of which is associated with a start time in some implementations. If using a normal record associated with a start time, the recorder 120 may initialize a count variable to that start time and may increment the count variable by the length of a time interval for each record other than a placeholder record between that normal record and the incomplete period (e.g., between the normal record and the first standby record already written as part of the incomplete period). If using the most recent placeholder record with a start time, the recorder 120 may initialize a count variable to that start time, increment the count variable by the length of a time interval multiplied by the total number of intervals represented by the placeholder record, and further increment the count variable for each record between that placeholder record and the incomplete period.

For example, suppose a previous placeholder record represents a previous incomplete period made up of two skipped intervals and three standby intervals, further suppose the previous placeholder record is associated with a start time of 2:15 pm, and further suppose there are eight normal records between the previous placeholder record and a standby record representing the beginning of the incomplete period in question. In this example, the count variable may be initially set to 2:15 pm, which is the start time of the previous incomplete period. The total number of time intervals between the beginning of previous incomplete period, represented by the previous placeholder record, and the incomplete period in question is thirteen, including two skipped intervals, three standby intervals, and eight normal intervals represented by respective normal records. The count interval is therefore incremented by a total of thirteen intervals times fifteen minutes per interval, or 195 minutes, resulting in a count variable indicating 5:30 pm, which is 195 minutes after 2:15 pm. It will be understood, however, that various mechanisms exist for determining the start time of the incomplete period.

At block 415, the recorder 120 determines a length of the incomplete period. More specifically, in some implementations, the length is the length of time between a start time of the incomplete period and the end time of the incomplete period. Thus, to determine the length, the recorder 120 may determine the difference between the end time of the incomplete period and the start time of the incomplete period. In some implementations, the length of the incomplete period is an integer multiple of the length of a time interval, because the incomplete period spans from a time-aligned start time to a time-aligned end time.

At block 420, one or more variables needed for generating the placeholder record may be initialized. For instance, a count of standby records may be initialized to zero. In some implementations, the recorder 120 maintains a parsing pointer, which references a memory location used for the purpose of generating placeholder records. The value of the parsing pointer (i.e., the location to which the parsing pointer refers) may be maintained, rather than being reset for the determination of each placeholder record. In some implementations, when the node 105 first begins recording records in the record storage 150, the parsing pointer may be set to refer to the memory location marking the beginning of the first record written. As described herein, the parsing pointer is adjusted when seeking information to generate a placeholder record. After such adjustment, the parsing pointer may stay at its updated position (i.e., maintaining its value) until the next time the parsing pointer is used and adjusted. The parsing pointer may be among the variables initialized; this initialization may include determining whether the parsing currently points to a placeholder record and, if so, incrementing the parsing pointer past that existing placeholder record.

At block 425, the recorder 120 begins scanning the record storage 150 at the parsing pointer (i.e., at the location in the record storage 150 referenced by the parsing pointer). At decision block 430, the recorder 120 determines what type of data is referenced by the parsing pointer at its current position.

If the parsing pointer points to a normal record, then at block 435, the parsing pointer is incremented by one record, and the method 400 returns to decision block 430. If the parsing pointer points to a standby record, then at block 440, the standby counter is incremented by one, the parsing pointer is incremented by one record, and the method 400 returns to decision block 430. This identification of record types referenced by the parsing pointer may continue until it is determined, at decision block 430, that the parsing pointer references blank data. For example, and not by way of limitation, the blank data may be null, invalid, or may have been previously erased. In some implementations, the blank data does not represent a valid record following the previous record referenced by the parsing pointer. In other words, the parsing pointer has reached the current point in time, and the next record to be written may be written at the location of the parsing pointer. When the parsing pointer references blank data, the method 400 proceeds to block 445.

At block 445, the recorder 120 determines the quantity of skipped intervals, which are time intervals for which no data was collected, in the incomplete period. In some implementations, the number of skipped intervals is equal to the total number of intervals in the incomplete period less the number of standby intervals. In some implementations, the total number of intervals in the incomplete period is the length of the incomplete period divided by the length of each time interval, which may be a fixed length as described above. The number of standby intervals in the complete period was determined above, as the number of standby intervals equals the number of standby records in the complete period because, in some implementations, one standby record was written for each standby interval. Thus, the recorder 120 may determine the number of skipped intervals by calculating the total number of intervals in the incomplete period, and then subtracting the number of standby intervals.

At block 450, the recorder 120 writes the new placeholder record to the record storage 150. In some implementations, the new placeholder record may be written in the same manner, or a similar manner in which other records or written. For instance, in some implementations, the recorder 120 writes the new placeholder record as a record following the last-written record, which may have been a normal record or a standby record, for example. The new placeholder record may include one or more of the following: a record identifier indicating that this is a placeholder record, the start time of the incomplete period, the number of standby intervals in the incomplete period, and the number of skipped intervals in the incomplete period. In some implementations, padding may be included in the new placeholder record to fill an amount of space expected in a complete record. For example, and not by way of limitation, zeroes may be used as the padding.

Figure 5:
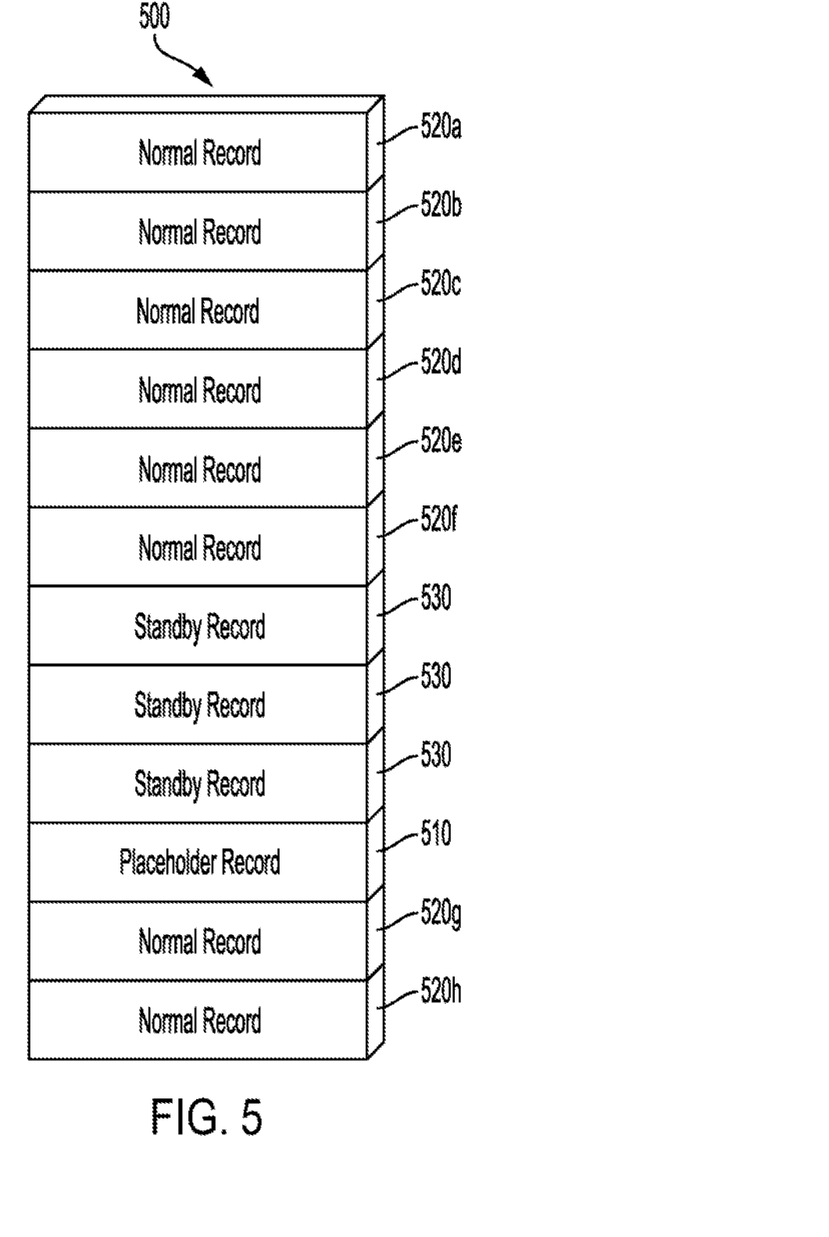
FIG. 5 is a block diagram of a buffer including a placeholder record, according to some implementations of the invention.

FIG. 5 is a block diagram of a buffer 500 including a placeholder record 510, according to some implementations of the invention. In the example of FIG. 5, the record storage 150 is implemented as the buffer 500, which takes a linear form such that each record is written into a memory location positioned after the record that was last written. It will be understood, however, that various other implementations are possible for the record storage 150. Specifically, FIG. 5 illustrates the appearance of such a record storage 150 after the writing of a placeholder record 510 and, further, after two additional normal records 520g-520h have been written with access to network time.

In some implementations, the record storage 150 includes a heterogeneous set of records, including one or more normal records 520a-520h (referred to collectively as normal records 520), one or more standby records 530, and one or more placeholder records 510. As described above, in some implementations, each normal record 520 is associated with a time interval that has a known start time, although that start time need not be recorded in the normal record 520 itself, and each normal record 520 includes collected data describing the respective time interval. In some implementations, each standby record 530 is associated with collected data but is not associated with a known start time. Each placeholder record 510 may describe an incomplete period of one or more time intervals for which network time is not known. To this end, a placeholder record 510 may include a start time of the incomplete period, an indication of the quantity of standby intervals in the incomplete period, and an indication of the quantity of skipped intervals in the incomplete period. Because a standby record 530 represents a time interval that took place during an incomplete period in some implementations, the incomplete period represented by a placeholder record 510 may also be represented by one or more standby records 530 in addition to the placeholder record 510.

In some implementations, by virtue of maintaining the records described herein, the record storage 150 describes events that occurred at the node 105. In this example, time intervals are fifteen minutes long and begin on the quarter hour. Further, the illustrated portion of the record storage 150 begins with a normal record 520a having a start time of 9:00 am.

As shown in FIG. 5, a series of normal records 520a-520f were recorded, each with collected data describing an activity that occurred during the respective time intervals. For each of these normal records 520a-520f, network time was available at least at the beginning of the respective time interval. In this example, these six normal records 520a-520f began at 9:00, 9:15, 9:30, 9:45, 10:00, and 10:15 respectively. After the last of these normal records 520 began (i.e., after 10:15), network time was lost, and three standby records 530 were recorded with collected data but without a knowledge of the current network time. Network time then became available again, and a placeholder record 510 was written to describe the incomplete period during which network time was not known and during which the standby records 530 were written. In this example, network time became available again at 12:06, and thus, the incomplete period spanned from 10:15 to 12:00. The time interval beginning at 12:00 was later recorded in a normal record 520g as a normal interval because a start time for that time interval became known when network time became available.

The incomplete period included three standby intervals represented by the three standby records 530 written prior to the availability of network time. Upon generating the placeholder record 510, the node 105 determined that the incomplete period included six total time intervals, and thus, three skipped intervals must have been a part of the incomplete period. Although not shown in FIG. 5, the placeholder record 510 may include the quantity of skipped intervals that occurred during the incomplete period. As shown in FIG. 5, a skipped interval is not represented in the record storage 150 by a corresponding record in some implementations but, rather, is represented by quantity in the placeholder record 510. Two additional normal records 520g-520h, having start times of 12:00 and 12:15 respectively, were then written to represent collected data after network time became available.

Figure 6:
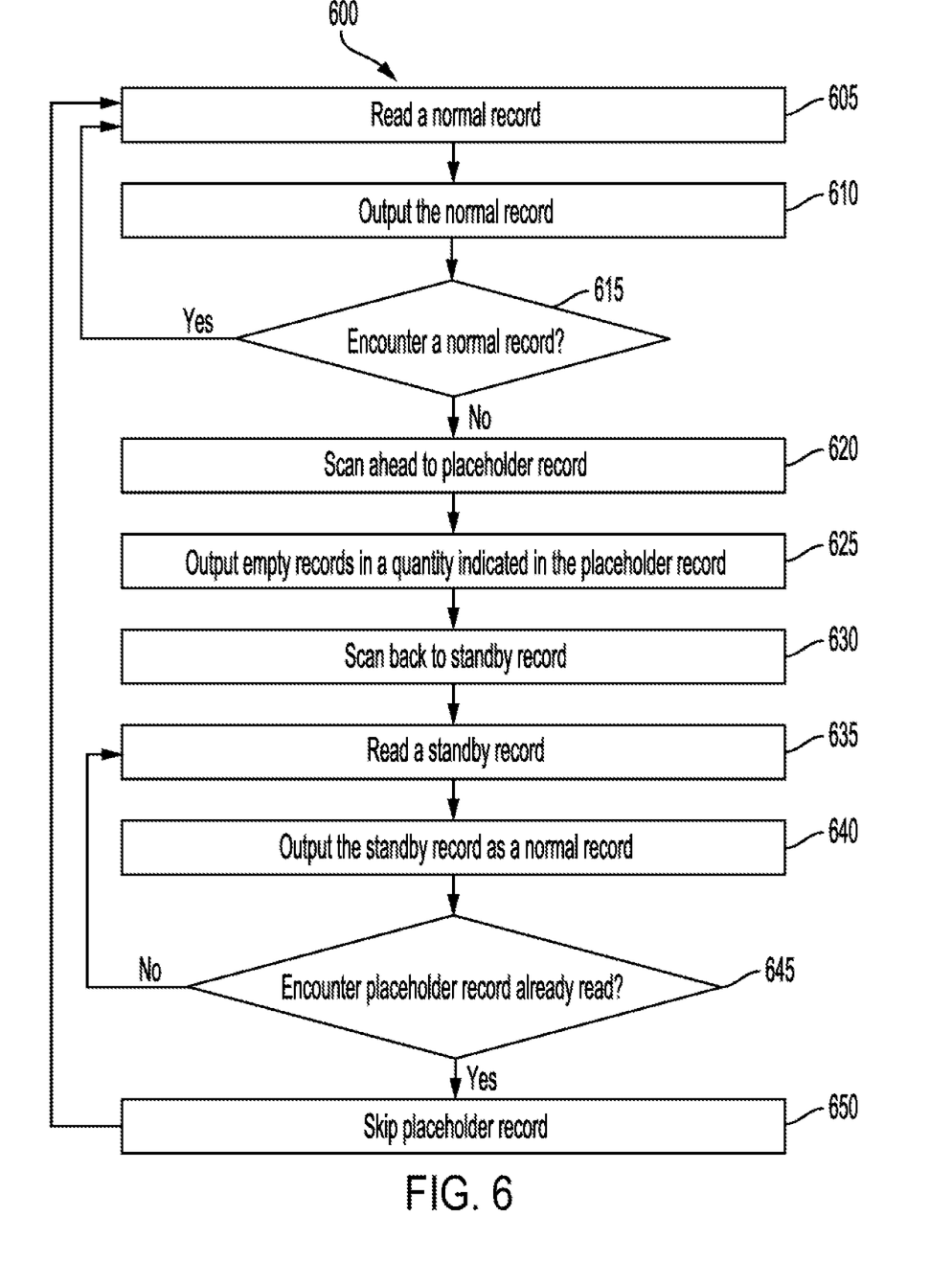
FIG. 6 is a flow diagram of a method of generating a data packet by outputting various records, using a placeholder record, according to some implementations of the invention.

FIG. 6 is a flow diagram of a method 600 of generating a data packet by outputting various records, using a placeholder record, according to some implementations of the invention. This method includes translating a placeholder record 510 so as to transmit one or more empty records and one or more standby records representing skipped intervals and standby intervals during an incomplete period. In some implementations, the act of translation occurs while a data packet is being transmitted via the communication device 140 or in preparation for such transmission. For instance, the translator 130 may perform this method 600 and may thereby write a signal to the communication device 140, enabling the communication device 140 to transmit the output of the translator 130 in the form of a data packet. For another example, the translator 130 may write its output to an output buffer, which the communication device 140 may read while transmitting that output in the form of a data packet. In other words, this method 600 may be part of a process of transmitting records from the record storage 150 to an external entity by way of the communication device 140.

As shown in FIG. 6, at block 605, the translator 130 reads a normal record 520 from the record storage 150, and at block 610, the translator 130 writes the normal record 520 to output for transmission for the communication device 140. At decision block 615, it may be determined whether the next record encountered is a normal record 520. If the next record is a normal record 520, then the method 600 returns to block 605 again, where the normal record 520 is read and then written to output. However, if the next record is not a normal record 520, the method 600 proceeds to block 620.

At block 620, responsive to encountering a record other than a normal record 520 (e.g., a standby record 530 or a placeholder record 510), the translator 130 scans ahead in the record storage 150 until reaching a placeholder record 510. If the record encountered is a placeholder record 510, then the translator 130 may scan ahead by zero records to reach a placeholder record 510; in other words, no scanning ahead is needed in that case, in some implementations.

In some case, the record encountered may be a standby record 530. As described above, in some implementations, there is no guarantee that this standby record 530 represents a time interval that immediately follows the time interval of the last normal record 520. Thus, there is no requirement that a standby record 530 that immediately follows a normal record 520 in the record storage 150 also immediately follows that normal record 520 in the output. However, it is expected by the external entity receiving the data packet that each record is time-aligned. In some implementations, because a standby record 530 represents a time interval during an incomplete period, and because a placeholder record 510 is written responsive to an incomplete period, it can be assumed that a placeholder record 510 will follow a series of standby records 530. Thus, responsive to encountering a standby record 530, the translator 130 may scan ahead in the record storage 150 until reaching the expected placeholder record 510.

At block 625, the translator 130 writes to output one empty record for each skipped interval indicated in the placeholder record 510. As described above, a placeholder record 510 may indicate a quantity of skipped intervals. The external entity receiving the data packet will expect one record per time interval. Thus, each skipped interval may be represented by an empty record in the data packet. For example, and not by way of limitation, an empty record may include only padding, such as all zeroes, to indicate that no collected data exists for the corresponding time interval.

In this example, the skipped intervals represented in the placeholder record 510 are transmitted as empty records prior to the standby records 530 represented in the placeholder record 510. Thus, in some implementations, if one or more standby records 530 are positioned between a normal record 520 and a placeholder record 510 in the record storage 120, those one or more standby records 530 are written into the data packet after empty records represented in the corresponding placeholder record 510, thereby shifting the positions of such standby records 530 to a position after the empty records. In an alternative example, the standby records 530 may be transmitted prior to the empty records. However, in some embodiments, transmitting the empty records prior to the standby records 530 presents a more accurate picture of activities that have occurred at the node 105 because, for example, skipped intervals, corresponding to empty records, occur when the node 105 is powered off, and upon being powered on, standby intervals occur prior to the node 105 joining a network and obtaining network time. This sequence of events is reflected in some embodiments by transmitting empty records prior to standby records 530 for each incomplete period.

At block 630, assuming that a standby record 530 was encountered prior to scanning ahead to the placeholder record 510, the translator 130 scans back to the standby record 530 encountered. In this example method 600, it is assumed that at least one standby record 530 precedes the placeholder record 510; however, it will be understood that this need not be the case. Rather, the placeholder record 510 may represent an incomplete period made up of skipped intervals and no standby intervals, and in that case, no standby records 530 would immediately precede the placeholder record 510 in some implementations.

At block 635, the translator 130 reads the standby record 530, and at block 640, the translator 130 writes the standby record 530 to output as a normal record 520. In some implementations, both standby records 530 and normal records 520 include collected data; thus, the difference between a standby record 530 and a normal record 520 is a known start time. In the transmitted data packet, however, the collected data of a standby record 530 is now implicitly associated with a start time, where that start time is based on the position in which the standby record 530 appears in the data packet. For instance, if exactly two empty records are included in the data packet prior to inclusion of a standby record 530, then two time intervals separate the last normal record 520 from the standby record 530. Thus, the standby record 530 is now associated with a start time equal to the start time of that normal record incremented by three time intervals (e.g., for the normal record 520 itself and for the two skipped intervals). Thus, in some implementations, the translator 130 implicitly establishes a start time for each standby record 530, and in the data packet, there is no difference between a normal record 520 and a standby record 530. In the data packet, a record that was previously a standby record 530 may appear no differently than a normal record 520.

At decision block 645, the translator 130 determines whether the next record encountered is the placeholder record 510 already read (i.e., prior to scanning backward to standby records 530). If the encountered record is not the placeholder record 510, the method 600 returns to block 635 to read another standby record 530. However, if the encountered record is the placeholder record 510, then because this placeholder record 510 has already been read and used, the translator 130 may skip the placeholder record 510 at block 650.

The method 600 may then return to block 605, to read one or more normal records 520 that follow. Although, for the sake of illustration, the method 600 shown assumes that a normal record 520 follows the placeholder record 510, it will be understood that this need not be the case. Rather, for instance, a standby record 530 may follow the placeholder record 510, in which case the method 600 may return to block 630 instead of block 605. Alternatively, a second placeholder record 610 may follow, in which case the translator 130 may write one or more empty records 710 as indicated in the second placeholder record 510 and may then return to block 605 of 630 if applicable. The method 600 of FIG. 6 may be repeated until all records to be included in the data packet have been read and output.

Figure 7:
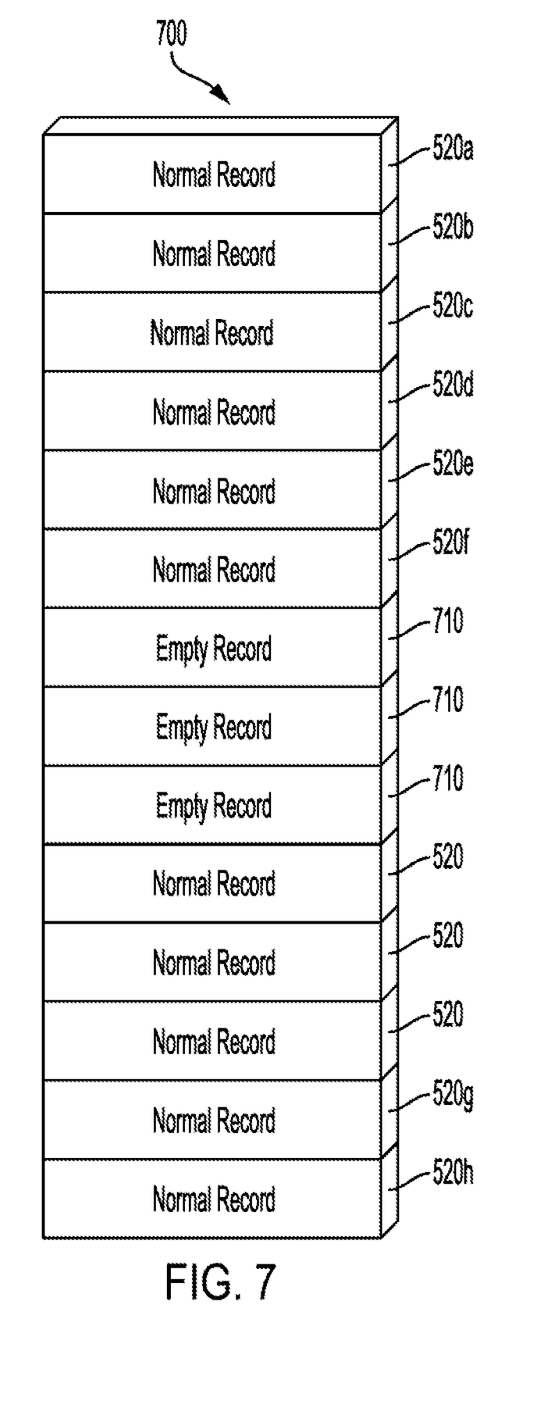
FIG. 7 is a block diagram of a data packet including various records, according to some implementations of the invention.

FIG. 7 is a block diagram of a data packet 700 including various records, according to some implementations of the invention. More specifically, the data packet 700 shown in FIG. 7 is the result of applying the above method 600 to the record storage 150 of FIG. 5. In some implementations, the data packet 700 is associated with an overall start time equal to the start time of the first record. This overall start time may be transmitted as part of the data packet 700, for example, as metadata. In this example, the start time of the first normal record 520a is 9:00 am, and thus the data packet 700 is associated with a start time of 9:00 am.

As shown in FIG. 7, in some implementations, the six normal records 520a-520f prior to the incomplete period are output as written in the record storage 150. Although a start time need not be output for each normal record 520, the start times may be implicit based on the start time of the data packet 700. Thus, the implicit start times of these six normal records 520a-520f as output are 9:00, 9:15, 9:30, 9:45, 10:00, and 10:15, respectively, which match their actual start times as described with reference to FIG. 5.

Upon encountering a standby record 530, the translator 130 scans ahead to the placeholder record 510 and determines that there were three skipped intervals during the incomplete period. As such, the translator 130 outputs three empty records 710, each of which may include padding rather than collected data. The implicit start times of the empty records are 10:30, 10:45, and 11:00, respectively. Following the empty records 710, the translator 130 outputs the collected data in the three standby records 530 in the form of three normal records 520 with implicit start times of 11:15, 11:30, and 11:45 respectively. The translator 130 then outputs the final two normal records 520g-520h, which have implicit start times of 12:00 and 12:15, respectively, which match the actual start times of those normal records 520g-520h.

Thus, as shown in FIG. 7, in some implementations, empty records 710 are not stored locally in the record storage 150 but still appear in the data packet 700 as expected based on the established format of data packets 700, and standby records 530 are time-aligned and thus treated as normal records 520.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device, such as a utility meter 200 or other node 105, can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, or additions to the present subject matter as would be readily apparent to one of ordinary skill in the art.

What is claimed is:

1. A method performed by a node, the method comprising:
   writing to a buffer one or more normal records, each normal record associated with a respective time interval having a respective start time and a respective end time according to network time, and each normal record comprising respective collected data describing an activity during the respective time interval, the network time provided through a network to which the node is joined;
   detecting that access to the network time has become unavailable;
   detecting that access to the network time has become available after having been unavailable;
   identifying an incomplete period during which the network time provided through the network was unavailable;
   determining a first count of one or more skipped intervals occurring during the incomplete period during which the network time was unavailable, wherein no collected data describing the activity is collected during each skipped interval in the incomplete period;
   determining a second count of one or more standby intervals occurring during the incomplete period during which the network time was unavailable, wherein each standby interval in the incomplete period is associated with respective collected data describing the activity during the incomplete period; and
   writing to the buffer a placeholder record, representing the incomplete period during which network time was unavailable, comprising the first count of the one or more skipped intervals and the second count of the one or more standby intervals.

2. The method of claim 1, further comprising writing to the buffer one or more standby records while the network time is unavailable, each standby record associated with a respective standby interval occurring during the incomplete period, and each standby record comprising the respective collected data describing the activity during the respective standby interval.

3. The method of claim 2, further comprising:
   calculating a total quantity of time intervals occurring during the incomplete period; and
   calculating the first count of the one or more skipped intervals occurring during the incomplete period, based on the total quantity of time intervals.

4. The method of claim 3, wherein calculating the first count of the one or more skipped intervals comprises subtracting the second count of the one or more standby intervals from the total quantity of time intervals in the incomplete period.

5. The method of claim 3, wherein calculating the total quantity of time intervals occurring during the incomplete period comprises:

determining an interval-aligned end time no later than a current time at which the network time became available;

setting an end time of the incomplete period to the interval-aligned end time;

calculating a length of the incomplete period by subtracting, from the end time of the incomplete period, the respective end time of a last normal record of the one or more normal records; and calculating the total quantity of time intervals in the incomplete period as a quotient of the length of the incomplete period and a length of a time interval.

6. The method of claim 1, further comprising transmitting a data packet describing a time period including the incomplete period, wherein transmitting the data packet comprises:

converting the placeholder record into one or more empty records that are interval-aligned, the one or more empty records having a quantity of the first count as indicated in the placeholder record, each empty record corresponding to a respective skipped interval occurring during the incomplete period and lacking respective collected data describing the activity; and shifting a start position of one or more standby records to a position relative to the one or more empty records, the one or more standby records having a quantity of the second count as indicated in the placeholder record, each standby record associated with a respective standby interval occurring during the incomplete period, and each standby record comprising respective collected data describing the activity during the respective standby interval.

7. The method of claim 6, wherein transmitting the data packet comprises transmitting a total quantity of normal records, standby records, and empty records equal to a quantity of time intervals in the time period.

8. The method of claim 1, further comprising transmitting a data packet describing a time period including the incomplete period, wherein transmitting the data packet comprises:

reading the one or more normal records;

outputting the one or more normal records;

reading one or more standby records, each standby record associated with a respective standby interval occurring during the incomplete period, and each standby record comprising the respective collected data describing the activity during the respective standby interval;

reading the placeholder record;

outputting, based on the placeholder record, one or more empty records representing the one or more skipped intervals occurring during the incomplete period, wherein a quantity of the one or more empty records is equal to the first count indicated in the placeholder record;

establishing, based on the placeholder record, an interval-aligned start time of the one or more standby records; and outputting the one or more standby records in association with the interval-aligned start time, wherein a quantity of the one or more standby records is equal to the second count indicated in the placeholder record.

9. A utility meter comprising:

a memory having computer-readable instructions; and one or more processors for executing the computer-readable instructions, the computer-readable instructions comprising:

writing to a buffer one or more normal records, each normal record associated with a respective time interval having a respective start time and a respective end time according to network time, and each normal record comprising respective collected data describing an activity during the respective time interval, the network time provided through a network to which the utility meter is joined;

detecting that access to the network time has become unavailable;

detecting that access to the network time has become available after having been unavailable;

identifying an incomplete period during which the network time provided through the network was unavailable;

determining a first count of one or more skipped intervals occurring during the incomplete period during which the network time was unavailable, wherein no collected data describing the activity is collected during each skipped interval in the incomplete period;

determining a second count of one or more standby intervals occurring during the incomplete period during which the network time was unavailable, wherein each standby interval in the incomplete period is associated with respective collected data describing the activity during the incomplete period; and writing to the buffer a placeholder record, representing the incomplete period during which network time was unavailable, comprising the first count of the one or more skipped intervals and the second count of the one or more standby intervals.

10. The utility meter of claim 9, the computer-readable instructions further comprising writing to the buffer one or more standby records while the network time is unavailable, each standby record associated with a respective standby interval occurring during the incomplete period, and each standby record comprising the respective collected data describing the activity during the respective standby interval.

11. The utility meter of claim 10, the computer-readable instructions further comprising:

calculating a total quantity of time intervals occurring during the incomplete period; and calculating the first count of the one or more skipped intervals occurring during the incomplete period, based on the total quantity of time intervals.

12. The utility meter of claim 11, wherein calculating the first count of the one or more skipped intervals comprises subtracting the second count of the one or more standby intervals from the total quantity of time intervals in the incomplete period.

13. The utility meter of claim 11, wherein calculating the total quantity of time intervals occurring during the incomplete period comprises:

determining an interval-aligned end time no later than a current time at which the network time became available;

setting an end time of the incomplete period to the interval-aligned end time;

calculating a length of the incomplete period by subtracting, from the end time of the incomplete period, the respective end time of a last normal record of the one or more normal records; and calculating the total quantity of time intervals in the incomplete period as a quotient of the length of the incomplete period and a length of a time interval.

14. The utility meter of claim 9, the computer-readable instructions further comprising transmitting a data packet describing a time period including the incomplete period, wherein transmitting the data packet comprises:
reading the one or more normal records;
outputting the one or more normal records;
reading one or more standby records, each standby record associated with a respective standby interval occurring during the incomplete period, and each standby record comprising the respective collected data describing the activity during the respective standby interval;
reading the placeholder record;
outputting, based on the placeholder record, one or more empty records representing the one or more skipped intervals occurring during the incomplete period, wherein a quantity of the one or more empty records is equal to the first count indicated in the placeholder record;
establishing, based on the placeholder record, an interval-aligned start time of the one or more standby records; and
outputting the one or more standby records in association with the interval-aligned start time, wherein a quantity of the one or more standby records is equal to the second count indicated in the placeholder record.

15. A computer-program product for writing heterogeneous records to a buffer, the computer-program product comprising a computer-readable storage medium having program instructions embodied thereon, the program instructions executable by a processor of a node to cause the processor to perform a method comprising:
writing to a buffer one or more normal records, each normal record associated with a respective time interval having a respective start time and a respective end time according to network time, and each normal record comprising respective collected data describing an activity during the respective time interval, the network time provided through a network to which the node is joined;
detecting that access to the network time has become unavailable;
detecting that access to the network time has become available after having been unavailable;
identifying an incomplete period during which the network time provided through the network was unavailable;
determining a first count of one or more skipped intervals occurring during the incomplete period during which the network time was unavailable, wherein no collected data describing the activity is collected during each skipped interval in the incomplete period;
determining a second count of one or more standby intervals occurring during the incomplete period during which the network time was unavailable, wherein each standby interval in the incomplete period is associated with respective collected data describing the activity during the incomplete period; and
writing to the buffer a placeholder record, representing the incomplete period during which network time was unavailable, comprising the first count of the one or more skipped intervals and the second count of the one or more standby intervals.

16. The computer-program product of claim 15, the method further comprising writing to the buffer one or more standby records while the network time is unavailable, each standby record associated with a respective standby interval occurring during the incomplete period, and each standby record comprising the respective collected data describing the activity during the respective standby interval.

17. The computer-program product of claim 16, the method further comprising:
calculating a total quantity of time intervals occurring during the incomplete period; and
calculating the first count of the one or more skipped intervals occurring during the incomplete period, based on the total quantity of time intervals.

18. The computer-program product of claim 17, wherein calculating the first count of the one or more skipped intervals comprises subtracting the second count of the one or more standby intervals from the total quantity of time intervals in the incomplete period.

19. The computer-program product of claim 17, wherein calculating the total quantity of time intervals occurring during the incomplete period comprises:
determining an interval-aligned end time no later than a current time at which the network time became available;
setting an end time of the incomplete period to the interval-aligned end time;
calculating a length of the incomplete period by subtracting, from the end time of the incomplete period, the respective end time of a last normal record of the one or more normal records; and
calculating the total quantity of time intervals in the incomplete period as a quotient of the length of the incomplete period and a length of a time interval.

20. The computer-program product of claim 15, the method further comprising transmitting a data packet describing a time period including the incomplete period, wherein transmitting the data packet comprises:
reading the one or more normal records;
outputting the one or more normal records;
reading one or more standby records, each standby record associated with a respective standby interval occurring during the incomplete period, and each standby record comprising the respective collected data describing the activity during the respective standby interval;
reading the placeholder record;
outputting, based on the placeholder record, one or more empty records representing the one or more skipped intervals occurring during the incomplete period, wherein a quantity of the one or more empty records is equal to the first count indicated in the placeholder record;
establishing, based on the placeholder record, an interval-aligned start time of the one or more standby records; and
outputting the one or more standby records in association with the interval-aligned start time, wherein a quantity of the one or more standby records is equal to the second count indicated in the placeholder record.

* * * * *